US010070429B2

(12) United States Patent
Lee et al.

(10) Patent No.: US 10,070,429 B2
(45) Date of Patent: Sep. 4, 2018

(54) METHOD AND APPARATUS FOR TRANSMITTING INFORMATION IN LOW LATENCY MOBILE COMMUNICATION SYSTEM

(71) Applicant: Electronics and Telecommunications Research Institute, Daejeon (KR)

(72) Inventors: Anseok Lee, Daejeon (KR); Sung Cheol Chang, Daejeon (KR); Soojung Jung, Daejeon (KR); Seungkwon Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 144 days.

(21) Appl. No.: 14/941,536

(22) Filed: Nov. 13, 2015

(65) Prior Publication Data
US 2016/0143008 A1    May 19, 2016

(30) Foreign Application Priority Data

Nov. 14, 2014 (KR) .......... 10-2014-0159190
Nov. 14, 2014 (KR) .......... 10-2014-0159191
Nov. 12, 2015 (KR) .......... 10-2015-0158954
Nov. 12, 2015 (KR) .......... 10-2015-0158959

(51) Int. Cl.
*H04W 72/04* (2009.01)

(52) U.S. Cl.
CPC ......... *H04W 72/042* (2013.01); *H04W 72/04* (2013.01); *H04W 72/048* (2013.01); *H04W 72/0413* (2013.01); *H04W 72/0446* (2013.01)

(58) Field of Classification Search
CPC ............ H04W 72/04; H04W 72/0413; H04W 72/042; H04W 72/0446; H04W 72/048
See application file for complete search history.

(56) References Cited

U.S. PATENT DOCUMENTS

| | | | | |
|---|---|---|---|---|
| 6,741,614 B1* | 5/2004 | Porter | .......... | H04B 7/2681 370/332 |
| 6,765,887 B1* | 7/2004 | Shiu | .......... | H04B 7/2628 370/329 |
| 8,203,947 B1* | 6/2012 | Sarkar | .......... | H04W 72/1247 370/230 |
| 9,077,851 B2* | 7/2015 | Kato | .......... | H04L 65/403 |
| 9,191,966 B2* | 11/2015 | Bienas | .......... | H04W 72/1215 |
| 2003/0100267 A1* | 5/2003 | Itoh | .......... | H04B 17/382 455/69 |

(Continued)

OTHER PUBLICATIONS

Anseok Lee, Sung Cheol Chang, "A study on control overhead reduction in low-latency cellular systems", KICS, 2015 Winter Seminar, Jan. 22, 2015, pp. 1045-1046.

*Primary Examiner* — Khaled Kassim
(74) *Attorney, Agent, or Firm* — Rabin & Berdo, P.C.

(57) ABSTRACT

Disclosed are a method and apparatus for transmitting information in a low latency mobile communication system. Delay time requests are obtained from terminals, and time intervals for transmitting control information for the respective terminals are determined on the basis of the delay time requests. Control information is transmitted to the respective terminals according to the determined time intervals.

13 Claims, 19 Drawing Sheets

(56) References Cited

U.S. PATENT DOCUMENTS

| | | | |
|---|---|---|---|
| 2007/0019667 A1* | 1/2007 | Mottier | H04B 7/2643 370/458 |
| 2007/0133475 A1* | 6/2007 | Peisa | H04W 56/0045 370/335 |
| 2008/0019340 A1* | 1/2008 | Ohta | H04L 1/1671 370/338 |
| 2008/0112440 A1* | 5/2008 | Bedekar | H04W 56/0045 370/519 |
| 2010/0202382 A1* | 8/2010 | Park | H04L 5/0053 370/329 |
| 2011/0003560 A1* | 1/2011 | Futaki | H04W 52/24 455/67.16 |
| 2011/0164597 A1* | 7/2011 | Amini | H04L 1/0041 370/338 |
| 2011/0199945 A1* | 8/2011 | Chang | H04W 52/241 370/281 |
| 2011/0217982 A1* | 9/2011 | Zhao | H04W 60/04 455/437 |
| 2011/0310782 A1 | 12/2011 | Kim et al. | |
| 2012/0133829 A1* | 5/2012 | Nakade | H04N 5/04 348/515 |
| 2012/0155438 A1 | 6/2012 | Shin et al. | |
| 2012/0249806 A1* | 10/2012 | Gong | H04N 5/247 348/207.1 |
| 2013/0272281 A1* | 10/2013 | Xu | H04L 1/1812 370/336 |
| 2014/0161063 A1 | 6/2014 | Yeh et al. | |
| 2015/0009953 A1 | 1/2015 | Park et al. | |
| 2015/0131503 A1* | 5/2015 | Sandberg | H04W 52/0235 370/311 |
| 2015/0289082 A1* | 10/2015 | Salokannel | G01S 1/042 455/41.2 |
| 2016/0072886 A1* | 3/2016 | Lin | H04L 67/1097 709/213 |
| 2016/0095105 A1* | 3/2016 | Chen | H04W 72/0413 370/329 |
| 2016/0128028 A1* | 5/2016 | Mallik | H04W 72/042 370/336 |
| 2016/0135170 A1* | 5/2016 | Chen | H04W 72/0413 370/336 |
| 2016/0174234 A1* | 6/2016 | Wang | H04B 17/24 370/329 |

* cited by examiner

| TERMINAL LATENCY CATEGORY | OFFSET | INTERVAL | NOTE |
|---|---|---|---|
| NORMAL | 0 (CELL SPECIFIC) | 10 (SHORTFRAME) | LATENCY TERMINAL LOW-PERFORMANCE UE |
| LOW LATENCY | 0 | 1 | HIGH-PERFORMANCE UE |

PDCCH REGION OF TERMINAL

METHOD AND APPARATUS FOR TRANSMITTING INFORMATION IN LOW LATENCY MOBILE COMMUNICATION SYSTEM

CROSS-REFERENCE TO RELATED APPLICATION

This application claims priority to and the benefit of Korean Patent Application Nos. 10-2014-0159190, 10-2014-0159191, 10-2015-0158954, and 10-2015-0158959 filed in the Korean Intellectual Property Office on Nov. 14, 2014, Nov. 14, 2014, Nov. 12, 2015, Nov. 12, 2015, the entire contents of which are incorporated herein by reference.

BACKGROUND OF THE INVENTION (a) Field of the Invention

The present invention relates to a method and apparatus for transmitting information in a low latency mobile communication system.

(b) Description of the Related Art

Recently, low latency services requiring a delay time within a few ms have been studied in a mobile communication field. In a cellular wireless access system, low latency services are services in need of mobility, coverage, and reliability provided by a cellular scheme among services considered in the tactile Internet. As automobiles have become smart, application of low latency wireless communication to vehicle-to-vehicle (V2V) or vehicle-to-infrastructure (V2I) low latency wireless communication has come to prominence. In a situation in which various real-time interactive multimedia services such as augmented reality, virtual reality, and real-time online games are increasingly provided, it is required to provide low latency services to allow users of the services to experience natural interactions.

For such low latency services, a short delay time is required in an air interface. To this end, a transmission time interval (TTI) having a length of 1 ms of an existing system (for example, 3GPP LTE-Advanced) is designed to have a short length of tens of us to hundreds of us. For example, it is considered to design a short TTI having a length of 100 us, about ⅒ level of the existing length.

When a system is designed with a short TTI, overhead of control information may be increased. That is, since a transmission period of control information is shortened according to the shortened TTI, the number of transmissions of control information is resultantly increased.

As the number of transmissions of the control information is increased the number for a terminal to receive control information is also increased. For example, in a case in which a TTI has a length as short as about 100 us, the number of reception of control information of the terminal is increased to about 10 times.

Also, when receiving control information, the terminal performs blind decoding on a physical downlink control channel (PDCCH) in every TTI, and as the number of times of receiving control information is increased and a process of receiving and decoding symbols is also increased, power consumption of terminals is further increased.

Meanwhile, in a resource allocation (RA) Type 0, among resource allocation modes currently used in a mobile communication system (LTE), bitmap resource allocation is performed by a resource allocation unit, that is, a resource block group (RGB). A size of the RGB (in RBs) is determined by a system bandwidth, and, for example, a size of RGB is fixed to 4 in a system having a bandwidth of 20 MHz. In a data transmission using a single TTI, when a length of the TTI is significantly reduced, a size of the RGB needs to be increased to enhance resource allocation efficiency.

Also, in case of performing data transmission using several TTIs, resource allocation may need to be performed efficiently using a more minute RGB unit. Also, in the RA Type 2 mode, a continuous resource allocation function of designating a starting RB of resource allocation and an end RB of resource allocation is provided. Even in this method, in case of data transmission using a short TTI, a large amount of bits are required for expressing allocated resources. Thus, it is required to reduce information related to resource allocation.

SUMMARY OF THE INVENTION

The present invention has been made in an effort to provide a method and apparatus having advantages of effectively transmitting control information in a mobile communication system providing a low latency service.

The present invention has also been made in an effort to provide a method and apparatus having advantages of effectively allocating resource by reducing information related to resource allocation increased by a transmission time interval (TTI) shortened in a mobile communication system.

An exemplary embodiment of the present invention provides a method for transmitting information in a mobile communication system providing a low latency service. The method includes obtaining delay time requests from terminals; determining time intervals for transmitting control information by terminals on the basis of the delay time requests from the respective terminals; and transmitting control information to the respective terminals according to the determined time intervals.

In the determining of the time intervals, control regions for transmitting control information for the respective terminals may be configured on the basis of the delay time requests, and the determining of the time intervals may include setting intervals on the basis of set values according to the delay time requests; determining offsets of the respective terminals; obtaining frame numbers on the basis of the intervals and the offsets; and configuring control regions by shortframes respectively corresponding to the obtained frame numbers.

In the obtaining of the frame numbers, frame numbers satisfying a condition of (SN % interval)=offset may be obtained, wherein SN may denote a shortframe number.

The intervals may be calculated in units of shortframe by the set value, and the shortframe may represent a subframe constituting a transmission time interval (TTI) shorter than an existing TTI, and in the setting of the intervals, a transmission delay time required for transmitting transmission data may be set to be smaller than or equal to a time duration corresponding to the delay time requests, and the transmission delay time may be varied according to the intervals and the number of TTIs used in the transmission data.

The determining of the time intervals may include configuring intervals and offsets on the basis of delay time requests previously set according to terminal types.

The transmitting of the control information may further include transmitting a resource allocation message including a start field indicating a position of resource in which data transmission is performed.

The method may further include adding an indicator in control information of a shortframe positioned ahead of a set shortframe such that a certain terminal does not receive control information in the set shortframe formed as a certain one shortframe or continued shortframes; and transmitting the control information having the added indicator in the shortframe positioned ahead.

In the adding of the indicator, when there is no control information to be transmitted to a certain terminal in n-th shortframe, the indicator may be added to control information of (n−1)-th shortframe, and in the transmitting, the indicator-added control information may be transmitted in the (n−1)-th shortframe.

In the adding of the indicator, when the terminals are classified into groups and there is no control information to be transmitted to n-th shortframe with respect to all the terminals of a certain terminal group, the indicator may be added.

Another exemplary embodiment of the present invention provides an apparatus for transmitting information in a mobile communication system providing a low latency service. The apparatus includes a radio frequency (RF) converter configured to transmit and receive a signal through an antenna; and a processor connected to the RF converter and configured to transmit control information, wherein the process include a request obtaining processor configured to obtain delay time requests from terminals; a control region configuring processor configured to configure control regions for transmitting control information of the respective terminals on the basis of the delay time requests from the terminals; and a control information transmission processor configured to transmit control information to the terminals through the control regions.

The control region configuring processor may configure the control regions with shortframes corresponding to frame numbers obtained on the basis of offsets of the terminals and intervals set on the basis of preset values according to the delay time requests.

The intervals may be calculated in units of shortframe by the preset values, the shortframe may represent a subframe constituting a transmission time interval (TTI) shorter than an existing TTI, and a transmission delay time required for transmitting transmission data may be varied according to the intervals and the number of TTIs of the transmission data.

The control information transmission processor may transmit a resource allocation message including a start field indicating a position of resource in which data transmission is performed.

The apparatus may further include a non-reception notification processor configured to, when there is no control information to be transmitted to a certain terminal in n-th shortframe, add an indicator indicating the corresponding information to control information of (n−1)-th shortframe and transmit the indicator-added control information.

When the terminals are classified into groups and there is no control information to be transmitted in n-th shortframe with respect to all the terminals of a certain terminal group, the non-reception notification processor may add the indicator to the control information and transmits the indicator-added control information.

Yet another exemplary embodiment of the present invention provides a method for transmitting resource allocation information in a mobile communication system providing a low latency service. The method includes checking a size of transmission time intervals (TTIs) used for data transmission; setting a resource allocation unit inverse proportionally according to the size of the TTIs; performing resource allocation according to the resource allocation unit; and generating resource allocation information according to the resource allocation and transmitting the generated resource allocation information.

In the setting of the resource allocation unit, a size of short radio resource blocks (sRBGs) expressed by 1 bit may be set inverse proportionally according to the size of the TTIs.

the setting of the resource allocation unit may include setting a size of sRBGs inverse proportionally according to the size of the TTIs, as a resource partitioning type 1 of a first set value; and setting a size of the sRBGs inverse proportionally according to the size of the TTIs, as a resource partitioning type 2 of a second set value, wherein a relationship of the first preset value×2=the second preset value may be satisfied.

The transmitting of the resource allocation information includes transmitting information regarding the resource partitioning type 1 or the resource partitioning type 2 according to the sizes of the sRBGs through downlink control information (DCI).

The generating and transmitting of the resource allocation information may further include transmitting information regarding the resource partitioning type 1 or the resource partitioning type 2 according to the sizes of the sRBGs through system information, wherein when a size of the sRBGs may be set to the resource partitioning type 1, in the performing of resource allocation, resource allocation may be performed in a block form in units of resource block (RB), and in the generating of the resource allocation information, resource allocation information including a start RB and a length of allocated resource and the length may be expressed by a value in an exponential form. And, when the size of the sRBGs is set to a resource partitioning type 2, in the performing of resource allocation, resource allocation may be performed in a block form in units of resource group block (RGB), and in the generating of the resource allocation information, resource allocation information including a start RGB and a length of allocated resource and the length may be expressed by a value in an exponential form.

DETAILED DESCRIPTION OF THE EMBODIMENTS

Figure 1:
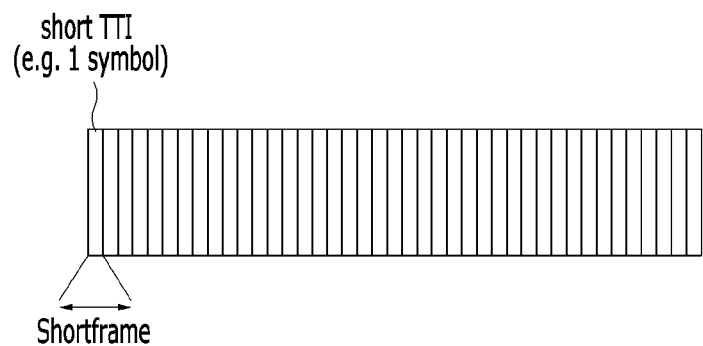
FIG. 1 is a view illustrating a frame structure of a mobile communication system supporting a low latency service according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

Throughout the specification, a terminal may refer to a mobile terminal (MT), a mobile station (MS), an advanced mobile station (AMS), a high reliability mobile station (HR-MS), an subscriber station (SS), a portable subscriber station (PSS), an access terminal (AT), or a user equipment (UE), and may include the entirety or a portion of functions of the MT, MS, AMS, HR-MS, SS, PSS, AT, or UE.

Also, a base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, small base stations (BSs) (e.g., a femto base station (BS), a home node B (HNB), a home eNodeB (HeNB), a pico BS, a metro BS, a micro BS, etc.), and the like, and may include the entirety or a portion of functions of an ABS, a node B, an eNodeB, an AP, an RAS, a BTS, an MMR-BS, an RS, an RN, an ARS, an HR-RS, a small BS, and the like.

Hereinafter, a method and apparatus for transmitting information in a low latency system according to an exemplary embodiment of the present invention will be described with reference to the accompanying drawings.

FIG. 1 is a view illustrating a frame structure of a mobile communication system supporting a low latency service according to an exemplary embodiment of the present invention.

A mobile communication system supporting a low latency service, that is, a low latency (LL) system, has a frame including a short transmission time interval (TTI) for the purpose of a short transmission time as illustrated in FIG. 1.

Each of subframes forming a TTI may be set to about 100 us at the minimum, for example, and may include one symbol. The LL system uses the same OFDM symbol as that of a legacy system for the purpose of interference prevention and minimum compatibility with respect to the legacy system, and the number of OFDM symbols forming the TTI may be determined by time constraint. For example, a TTI may be formed of one symbol. In addition to one symbol TTI, the TTI may also be formed of two or three symbols.

Figure 2:
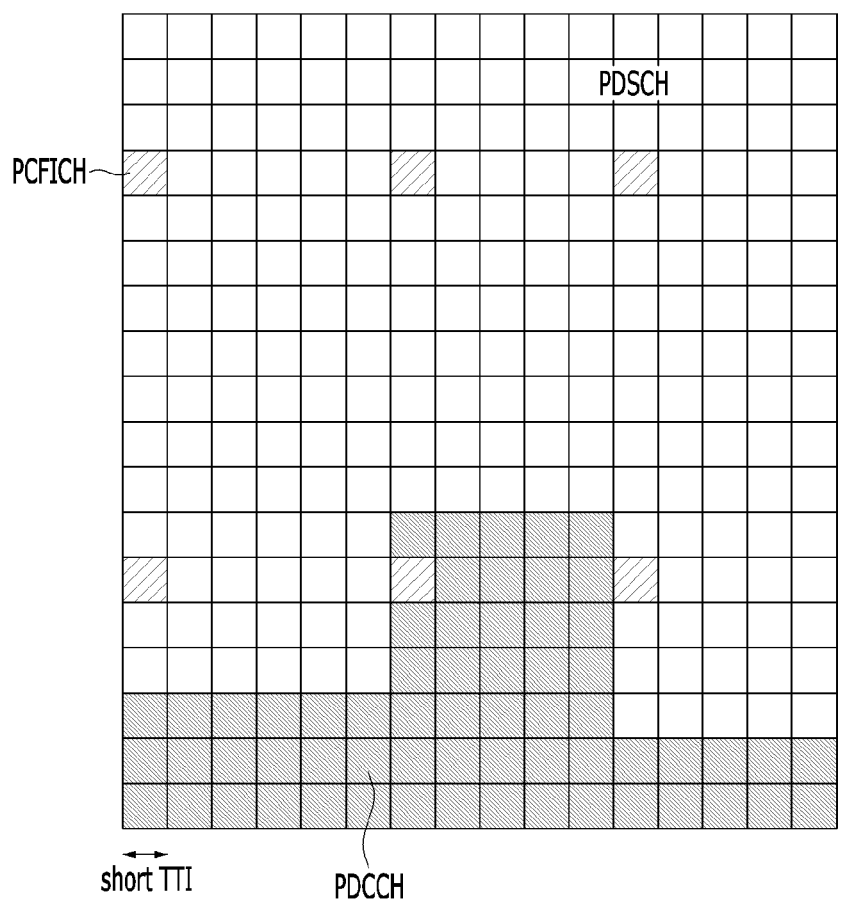
FIGS. 2 and 3 are views illustrating control regions and resource allocation of the low latency system according to an exemplary embodiment of the present invention.
Figure 3:
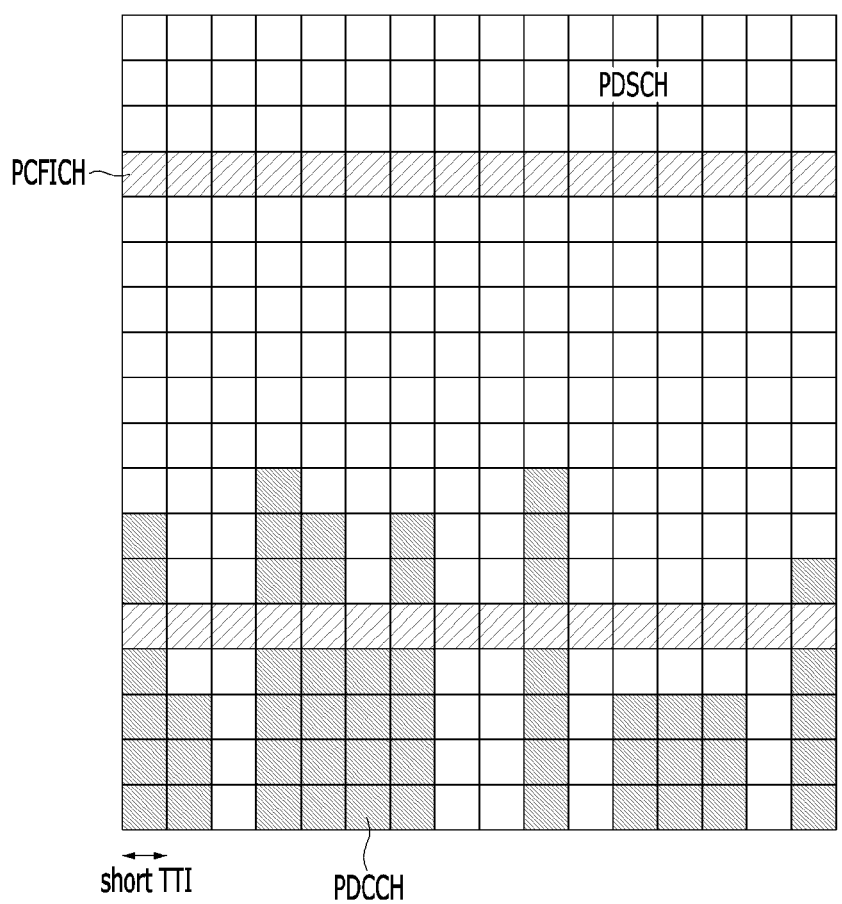

FIGS. 2 and 3 are views illustrating control regions and resource allocation of the low latency system according to an exemplary embodiment of the present invention.

In the LL system, a control region in which control information is transmitted may be allocated as illustrated in FIG. 2. As illustrated in FIG. 2, the presence of control information may be indicated by a physical control format indicator channel (PCFICH), and control information may be transmitted through a physical downlink control channel (PDCCH).

In the low latency system, a TTI formed of a minimum of one system is considered, and thus, it may be impossible to configure a control region and a data region in which time is divided. Thus, in the LL system, control information needs to be configured in a portion of an entire frequency, and a control region in which control information is formed may be fixed or varied according to system configurations. That is, as illustrated in FIG. 3, a position of a control region in which control information is configured may be varied.

Meanwhile, in the LL system, different delay times may be requested by terminals. In a case in which terminals use different services, the terminals may request different delay times according to services in use.

Figure 4:
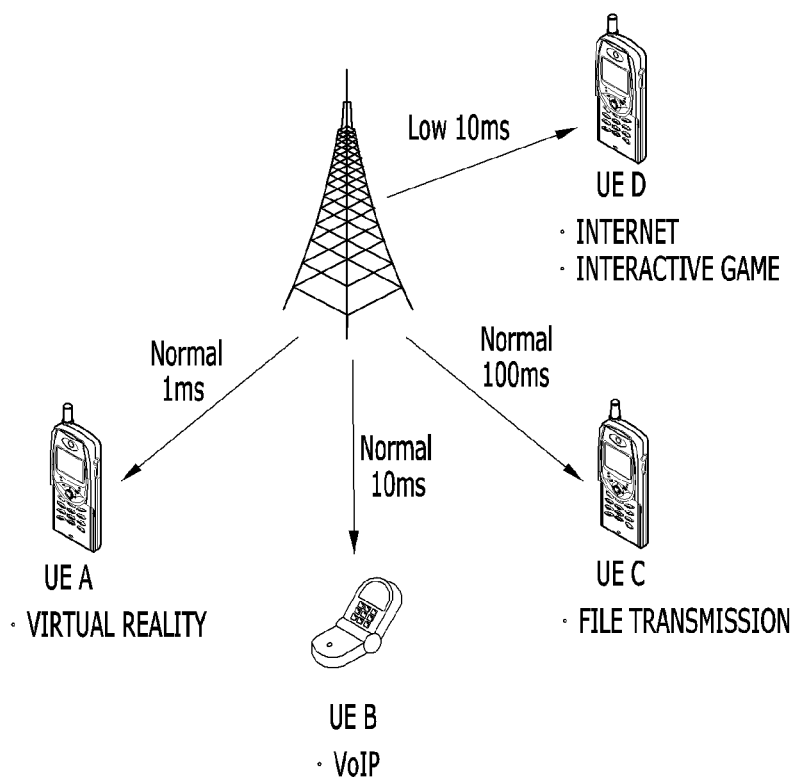
FIG. 4 is a view illustrating a situation in which terminals request different delay times in a low latency system according to an exemplary embodiment of the present invention.

FIG. 4 is a view illustrating a situation in which terminals request different delay times in a low latency system according to an exemplary embodiment of the present invention.

For example, as illustrated in FIG. 4, in a case in which a terminal 1 (UE A) receives a virtual reality service, a terminal 2 (UE B) receives a voice over Internet protocol (VoIP) service, a terminal 3 (UE C) receives a file transmission service, and a terminal 4 (UE D) receives an interactive game service using the Internet, each of the terminals may request different delay times according to characteristics of the services provided to each of the terminals.

Delay time requests of a terminal may be represented by the shortest one among delay time requests of each radio bearer (RB), and delay time requests of RBs may be classified as illustrated in Table 1 below.

TABLE 1

| RB | Lo CH | PDCP | RLC | LCID | MAC Hdr | HARQ | RNTI | Tr CH | Latency |
|---|---|---|---|---|---|---|---|---|---|
| DRB0 | DL DTCH 0 | USED | UM/AM | 3 | Normal | Normal | C-RNTI | DL SCH1 | Normal |
| DRB1 | DL DTCH 1 | USED | UM/AM | 4 | Normal | Normal | C-RNTI | DL SCH1 | Very Low |
| DRB2 | DL DTCH 2 | USED | UM/AM | 5 | Normal | Normal | C-RNTI | DL SCH1 | Low |

Here, the latency items denote a delay time class of each RB. Normal denotes that a delay time of about 50 to 300 ms is required, and the normal class may be further divided. The low and very low classes denote having a delay time request shorter than a normal class. For example, low requests a delay time of about 10 ms, and very low requests a delay time of about 1 ms.

The delay time request of each RB having such classification characteristics is transmitted to a network and a base station (BS) through setting of an RB, and used as information for determining a delay time request of a terminal.

On the basis of the delay time request of the terminals, control regions, that is, PDCCHs, may be configured for each terminal. As illustrated in FIG. 4, delay time requests may differ according to services used by the terminals, and in this case, PDCHs may be configured as illustrated in FIG. 5.

Figure 5:
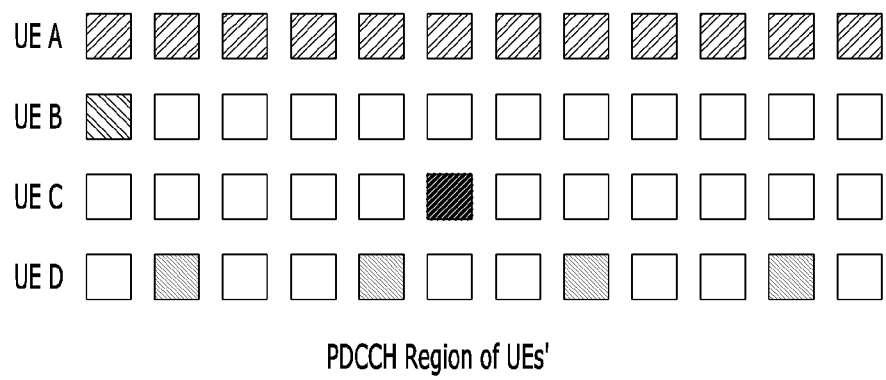
FIG. 5 is a view illustrating a configuration of PDCCHs for each delay time request according to an exemplary embodiment of the present invention.

FIG. 5 is a view illustrating a configuration of PDCCHs for each delay time request according to an exemplary embodiment of the present invention.

A base station (BS) configures PDCCH regions for each terminal through the delay time requests from the terminals in a radio resource control (RRC) configuration procedure. The PDCCH regions for each terminal may be defined by, for example, an offset and an internal. Intervals between the PDCCH regions may be varied according to the delay time requests from the terminals, and the intervals may be calculated in units of shortframe based on a pre set value according to the delay time requests. Here, the shortframe represents each subframe constituting a short TTI, and in a case in which a TTI is formed of about a minimum of 100 us, the shortframe may be configured as one symbol. An offset for configuration of the PDCCH regions may be set to the same value or different values in each of the terminals. In addition, in a case in which the number of terminals that receive PDCCHs or sizes of control information are significantly different according to shortframes, offsets of the terminals may be changed to smoothen the difference.

On the basis of the offsets and intervals, a shortframe number (SN) satisfying a condition of (SN % Interval) ==Offset is obtained and a PDCCH region is configured for a shortframe corresponding to the obtained SN.

Accordingly, as illustrated in FIG. 5, PDCCH regions are configured for each of the terminals having different delay time requests, and time intervals at which control information is transmitted to each of the terminals is varied. A time interval at which the PDCCH regions, as control regions for transmitting control information, are transmitted is short for a terminal 1 (UE A) which requests a delay time of 1 ms for a virtual reality service, compared with a terminal 2 (UE B) which requests a delay time of 100 ms for a VoIP service, and a terminal 3 (UE C) which requests a delay time of 100 ms for a file transmission service. In this manner, the intervals at which the PDCCH regions are transmitted is short for the terminals (UE A or UE D) which request a high delay time, and the intervals at which the PDCCH regions are transmitted is long for the terminals (UE B or UE C) which request a low delay time, whereby the terminals which request the low delay time do not need to perform decoding in a partial TTI. As a result, since the number of times of decoding by the terminals is reduced, power consumption of the terminals may be reduced, compared with the method of decoding PDCCHs in every TTI.

The method of setting an interval between the PDCCH regions according to a delay time request from a terminal will be described in detail.

Figure 6:
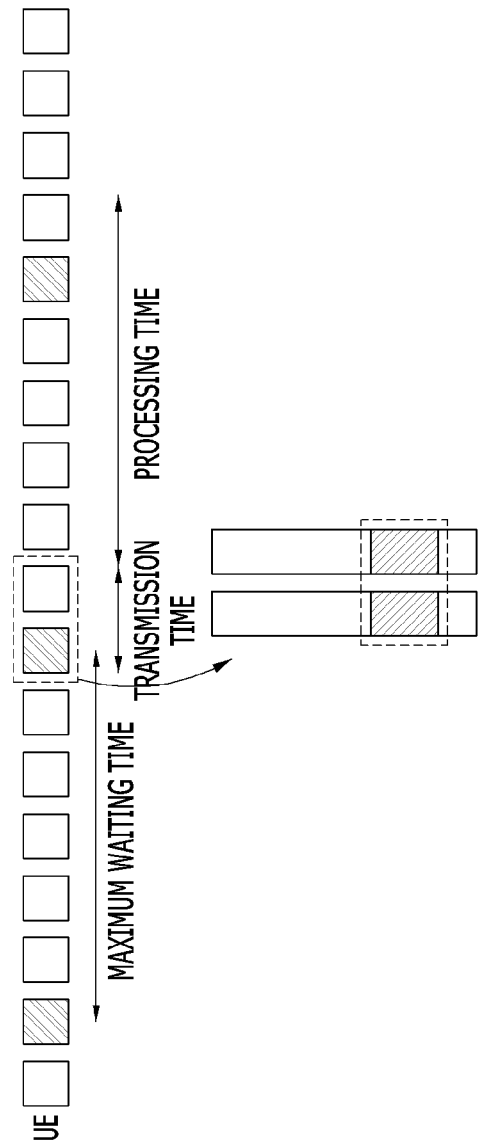
FIG. 6 is a view illustrating setting a space between PDCCH regions according to an exemplary embodiment of the present invention.

FIG. 6 is a view illustrating setting a space between PDCCH regions according to an exemplary embodiment of the present invention.

When a BS sets an interval for a PDCCH region for each terminal, the BS considers a delay time request of each terminal.

A maximum waiting time for transmission of resource allocation information corresponds to an interval, and a transmission time corresponds to a length of an allocated TTI of transmission data. For example, in a case in which the BS transmits data using only a single TTI, the transmission time is one shortframe, and in a case in which the BS transmits data through several TTIs, a transmission time is equal to a length of the allocated TTI. A processing time denotes a time for a terminal to process received data, and may be defined as about three times a length of the transmitted TTI.

When an interval is I and the number of used TTIs of transmission data is M, a transmission delay time (latency) may be calculated as expressed by Equation 1 below.

$$\text{Latency} = I + 4M \qquad [\text{Equation 1}]$$

The BS should set the transmission delay time of the terminal such that it is smaller than or equal to a requested delay time. For example, in a case in which a terminal requests a delay time of 1 ms in a system having a TTI of 100 us, when the terminal performs data transmission using two TTIs, a transmission delay time estimated on the basis of Equation 1 is 1+800 us. In order for the transmission delay time to be smaller than 1 ms, an interval between the PDCCH regions should be set to be smaller than or equal to two shortframes.

Meanwhile, when configuring a PDCCH region, the BS may configure the PDDCH region in consideration of even a data transmission amount as well as a delay time request of a terminal. Also, the BS may change the configuration of the region of the PDCCH, and may change the configuration of the region of the PDCCH through an RRC reconfiguration procedure.

As described above, in a case in which the PDCCH region, a control region, for transmitting control information is configured on the basis of a delay time request from each terminal and the PDCCH region is configured using an offset and an interval, a delay time request and a data request amount of each terminal should be updated and information regarding a corresponding offset and interval should be transmitted to each terminal.

Thus, the PDCCH regions may be set in advance according to types of terminals.

Figure 7:
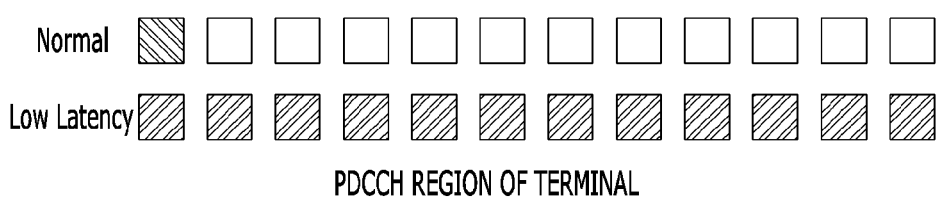
FIG. 7 is a view illustrating a case in which a PDCCH region is set in advance according to types of terminals according to an exemplary embodiment of the present invention.

FIG. 7 is a view illustrating a case in which a PDCCH region is set in advance according to types of terminals according to an exemplary embodiment of the present invention.

As illustrated in FIG. 7, types of terminals are classified into normal and low latencies according to latency characteristics of the terminals, and offsets and intervals are set in advance according to types of the terminals. PDCCH regions are set in advance according to the types of terminals on the basis of the set offsets and intervals.

In such a case, the BS may transmit control information by using only the PDCCH regions set according to types of the terminals. In this method, PDCCH regions of the terminals may be set irrespective of an RRC configuration procedure.

Meanwhile, in a case in which the PDCCH regions of the terminals are limited to some shortframes, for example, in a case in which the PDCCH regions are limited to shortframes in which a PDCCH for resource allocation is transmitted, data transmission may also be limited to some shortframes. In this case, a delay time of a terminal which is allocated a smaller amount of PDCCHs may be lengthened due to data region congestion of some shortframes. Thus, in shortframes in which PDCCHs transmitting control information is present, resource for data transmission may be allocated in a different shortframe.

In order to indicate data transmission resource in a different shortframe, a start field is added to a resource allocation message (downlink control information, etc.) to thereby indicate a position of resource in which data transmission is actually performed.

Figure 8:
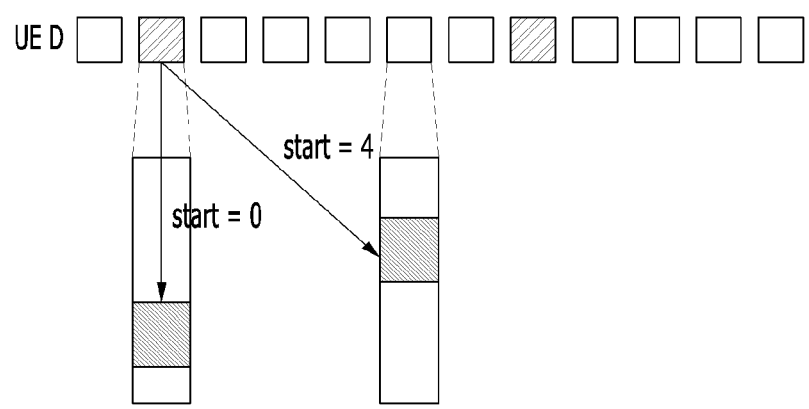
FIG. 8 is a view illustrating data transmission resource in different shortframes using a start field in an exemplary embodiment of the present invention.

FIG. 8 is a view illustrating data transmission resource in different shortframes using a start field in an exemplary embodiment of the present invention.

While transmitting a resource allocation message in a shortframe in which a PDCCH transmitting control information is present, a start field is added to the resource allocation message and transmitted. The start field indicates that a position of resource in which data is actually transmitted, for example, start=4, that is, data is transmitted in a fourth shortframe from a shortframe in which a PDCCH is transmitted.

Figure 9:
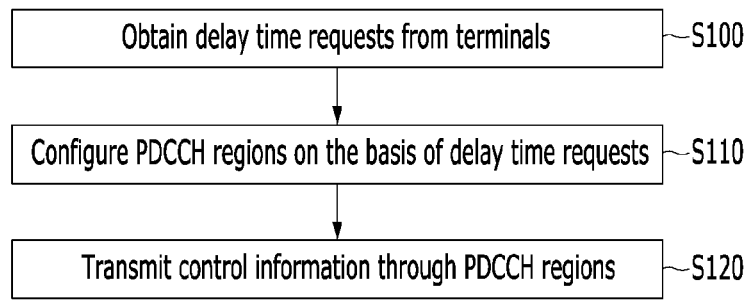
FIG. 9 is a flow chart illustrating a method for transmitting control information according to an exemplary embodiment of the present invention.

FIG. 9 is a flow chart illustrating a method for transmitting control information according to an exemplary embodiment of the present invention.

A BS 1 obtains delay time requests from terminals as illustrated in FIG. 9 (S100). The BS 1 may obtain delay time requests (for example, a delay time class of an RB) from terminals when establishing an RB with the terminals.

The BS 1 configures a PDCCH region as a control region for transmitting control information on the basis of the delay times from the terminals (S110). Here, intervals are calculated in units of shortframes on the basis of the delay time requests, and offsets are determined for the terminals. Shortframe numbers satisfying a predetermined condition is obtained on the basis of the intervals and the offsets, and PDCCH regions for the terminals are configured using the shortframes corresponding to the obtained shortframe numbers. In this case, the BS may transmit information regarding the offsets and intervals to the terminals.

The BS 1 transmits control information to the terminals through the configured PDCCH regions (S120). Here, when the control information is transmitted, while transmitting a resource allocation message in a shortframe in which a PDCCH transmitting control information is present, a start field may be added to the resource allocation message to indicate a position of resource in which data is actually transmitted.

Meanwhile, as discussed above, the BS 1 may check types of the terminals, performs a process of obtaining intervals and offsets for configuration of PDCCH regions by using delay time requests previously set for types of terminals, check the PDCCH regions, and subsequently transmit control information through the checked PDCCH regions, instead of obtaining delay time requests.

Through this process, the PDCCH regions as control regions transmitting control information may be configured on the basis of the delay time requests of the terminals, whereby terminals having a low delay time request may not perform decoding in some PDCCH regions.

Meanwhile, in the exemplary embodiment described above, the terminals having low delay time request do not perform decoding in some shortframes, but relatively, a terminal or a type of terminal having a high delay time is a low latency device, PDCCH decoding needs to be performed in a great amount of shortframes.

Thus, in another exemplary embodiment of the present invention, terminals do not receive control information randomly.

Figure 10:
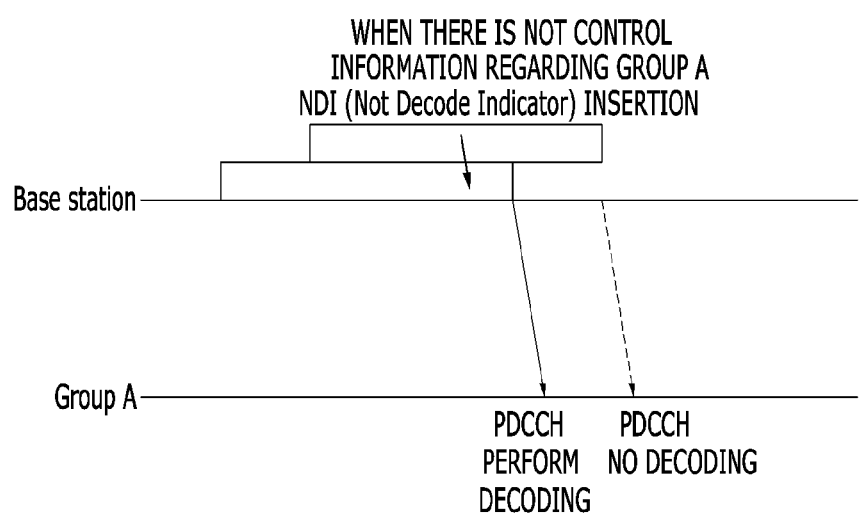
FIG. 10 is a conceptual view illustrating a method for transmitting control information according to another exemplary embodiment of the present invention.

FIG. 10 is a conceptual view illustrating a method for transmitting control information according to another exemplary embodiment of the present invention.

In another exemplary embodiment of the present invention, a terminal, or a terminal type, having a high delay time request performs PDCCH decoding in shortframes in which a relatively large amount of terminals as low latency terminals (referred to as low latency terminals for the purposes of description) are present, and thus, control information is not received randomly in consideration of an increase in overhead of PDCCH decoding. That is, in a case in which the BS may inform a specific low latency terminal or group about non-reception of control information in a next TTI, a reception amount of control information of the corresponding low latency terminal or a terminal belonging to a corresponding group may be reduced.

In detail, as illustrated in FIG. 10, in a case in which there is no control information to be transmitted to a specific terminal group A in n-th shortframe, a separate indicator is added to control information of (n−1)-th shortframe in order to indicate that there is no need to perform decoding at the next shortframe, that is, the n-th shortframe. Such an indicator may be terms a "not decode PDCCH indicator" for the purposes of description.

Here, the terminal group is a group arbitrarily defined for non-reception of control information. The BS classifies the entire terminals into some groups, and in a case in which there is no control information to be transmitted to all the terminals of the corresponding group by group, the BS informs that there is no need to perform decoding in a next shortframe by using the foregoing indicator in a shortframe immediately before a shortframe in which control information is not transmitted. Thus, a terminal, which is informed that there is no control information transmitted in a next shortframe through the indicator added to the control information, does not perform decoding. Thus, control information reception overhead of the terminals of the corresponding group may be reduced. As for setting of a terminal group, the terminal group may be set in establishing an RRC connection and the group may be changed during an operation.

Meanwhile, the indicator (not decode PDCCH indicator) allows for terminal unit signaling, as well as group unit signaling.

An indicator for non-reception of control information may indicate non-reception of control information in several continued shortframes. That is, information regarding the number of shortframes not transmitting control information may be informed to each group or a terminal in advance by using an indicator.

Also, in case of control information non-reception signaling, control information non-reception information in a subsequent specific shortframe, as well as non-reception in a next adjacent shortframe, may be transmitted through an indicator.

Table 2 shows information included in the not decode PDCCH indicator for random control information non-reception, and it may be implemented through downlink control information (DCI) of an existing LTE system.

TABLE 2

| Field | Length | Value | Note |
|---|---|---|---|
| Start shortframes | 0 or 3 (bits) | Start of non-decode shortframes | When value is x, shortframe of (corresponding shortframe number + xth shortframe) is determined as non-decode start shortframe. |
| Number of non-decode shortframes | 0 or 3 (bits) | Number of non-decode Shortframes | When value is x, terminal does not perform decoding in (x + 1) number of shortframes from start position. |

Figure 11:
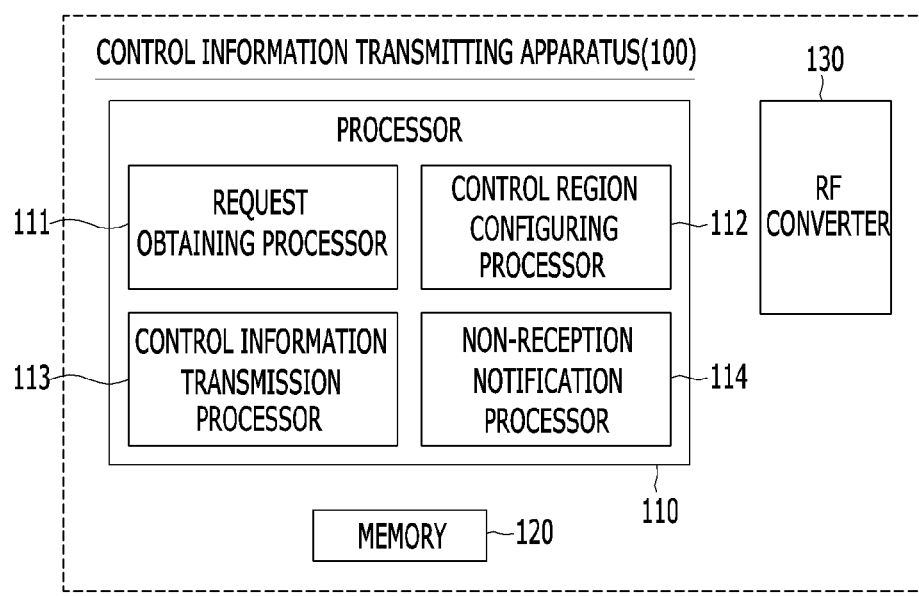
FIG. 11 is a view illustrating a structure of a control information transmitting apparatus according to an exemplary embodiment of the present invention.

FIG. 11 is a view illustrating a structure of a control information transmitting apparatus according to an exemplary embodiment of the present invention.

As illustrated in FIG. 11, a control information transmitting apparatus 100 according to an exemplary embodiment of the present invention includes a processor 110, a memory 120, and a radio frequency (RF) converter 130. The processor 110 may be configured to implement the methods described above with reference to FIGS. 1 through 10.

To this end, the processor 110 further includes a request obtaining processor 111, a control region configuring processor 112, and a control information transmission processor 113, and further includes a non-reception notification processor 114.

The request obtaining processor 111 obtains delay time requests from terminals. When establishing a radio bearer (RB) with terminals, the request obtaining processor 111 may obtain a delay time class of an RB from the terminals and use the obtained delay time class as a delay time request.

The control region configuring processor 112 configures a PDCCH region as a control region transmitting control information on the basis of the delay time request, and varies a time interval at which control information is transmitted. The control region configuring processor 112 calculates intervals by shortframe on the basis of the delay time request and determines offsets for terminals to obtain shortframe numbers satisfying a predetermined condition on the basis of the intervals and the offsets and configure PDCCH regions by using shortframes corresponding to the shortframe numbers.

In addition, the control region configuring processor 112 may check types of the terminals and configure PDCCH regions by using delay time requests previously set for the types of terminals.

The control information transmission processor 113 transmits control information through the PDCCH regions as control regions respectively configured for the terminals. Here, while transmitting a resource allocation message through the PDCCH regions, the control information transmission processor 113 may add a start field to the resource allocation message to represent a position indicating data transmission resource in other subframe, that is, in other shortframe.

The non-reception notification processor 114 allows a terminal not to receive control information randomly. To this end, when there is no control information to be transmitted to a specific terminal group in an n-th shortframe, the non-reception notification processor 114 adds an indicator to control information of (n−1)-th shortframe in order to indicate that decoding is not required in a next shortframe, that is, in n-th shortframe.

The memory 120 is connected to the processor 110 and stores various types of information relate to an operation of the processor 110. The RF converter 130 is connected to the processor 110 and transmits or receives an RF signal.

Figure 12:
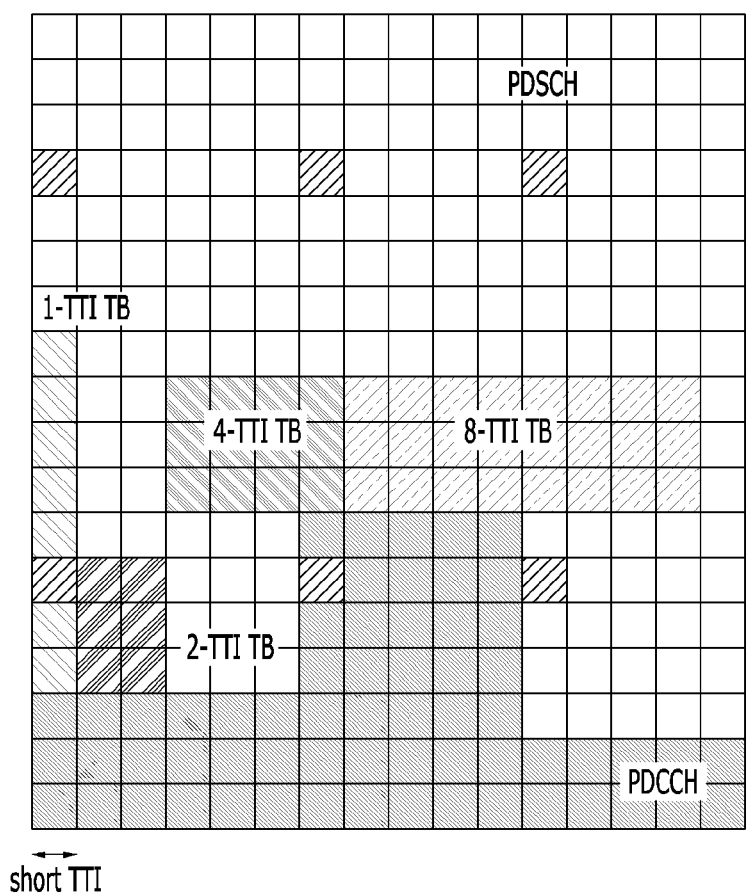
FIG. 12 is a view illustrating allocation of multiple TTI resource in a low latency system according to another exemplary embodiment of the present invention.

FIG. 12 is a view illustrating allocation of multiple TTI resource in a low latency system according to another exemplary embodiment of the present invention.

The low latency system considers a TTI having a length of a minimum one symbol. However, in a case in which a cell region is large, data transmission in units of one symbol may have low efficiency, and thus, the low latency system has a structure of performing data transmission in units of several TTIs. For example, as illustrated in FIG. 12, data transmission may be performed by using one, two, four, and eight TTIs successively.

In the low latency system using a short TTI, a size of resource for transmitting control information is also reduced in proportion to a reduced transmission time. Thus, the size of control information needs to be minimized. In control information, information for resource allocation, that is, resource allocation information, forms a greater part, and thus, it is required for the resource allocation information to be designed to fit a frame structure using a shortened transmission time.

A resource allocation method includes a resource allocation method in a bitmap form and a resource allocation method in a block form. In the resource allocation method in a bitmap form, bitmap allocation is performed in units of resource block group (RGB), and the allocated RGB is indicated by a bitmap.

In another exemplary embodiment of the present invention, different transmission times including a plurality of short TTIs are assumed. Even in a case in which a normal TTI of a legacy system and a short TTI of the low latency system coexist, resource may be effectively allocated by using the method according to the exemplary embodiment of the present invention.

Figure 13:
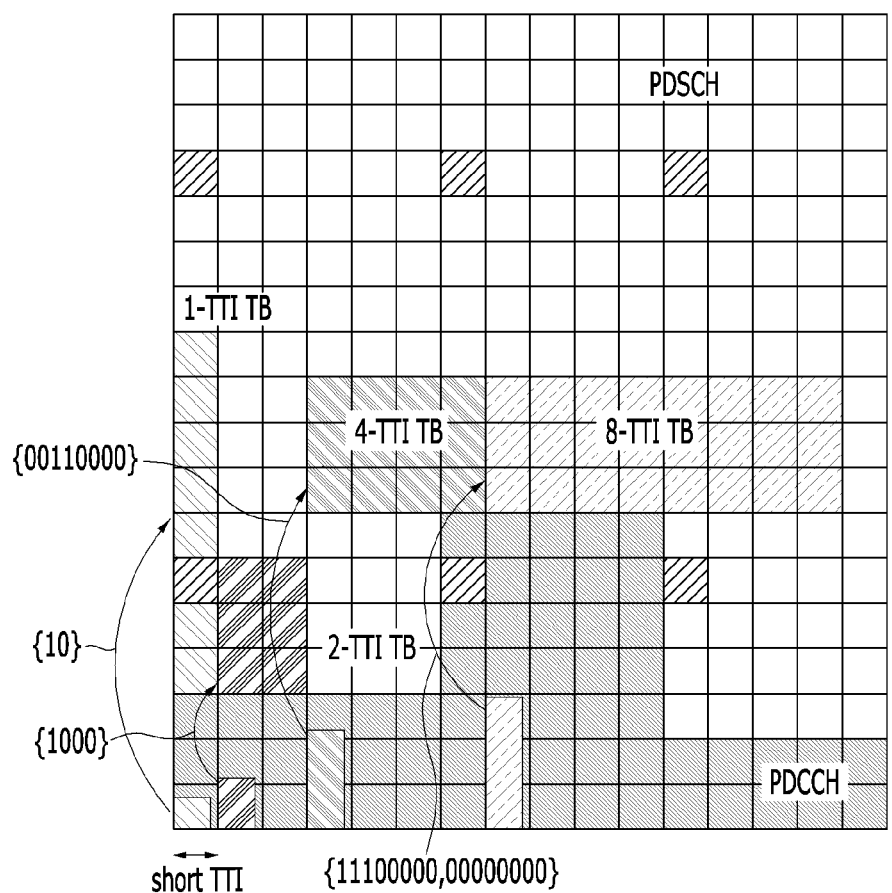
FIG. 13 is a view illustrating resource allocation in the form of a bitmap for transmitting multiple TTI according to another exemplary embodiment of the present invention.

FIG. 13 is a view illustrating resource allocation in the form of a bitmap for transmitting multiple TTI according to another exemplary embodiment of the present invention.

In a case in which data transmission is performed by using one, two, four, and eight short TTIs successively, for example, bitmap allocation may be performed as illustrated in FIG. 13.

When bitmap allocation is performed in data transmission using a smaller amount of TTIs, a size of short RGB (sRBG) as a size of resource expressed by one bit is relatively large. In this case, resource allocation may be performed on the entire resource by a smaller number of bits. Meanwhile, in data transmission using a larger number of TTIs, a size of sRBG as a size of resource expressed by 1 bit is relatively small, and in this case, resource allocation may be performed more minutely.

The size of the RGB is determined by a system bandwidth. Table 3 shows values (P) indicating RGB sizes for respective frequency bands of the legacy system by the number of resource blocks (RBs).

TABLE 3

| system bandwidth $N_{RB}^{DL}$ | RBG size (P) |
| --- | --- |
| ≤10 | 1 |
| 11-26 | 2 |
| 27-63 | 3 |
| 64-110 | 4 |

Here, the legacy system refers to an already defined existing system. For example, the legacy system may be an existing 3GPP LTE-A system.

In the low latency system according to an exemplary embodiment of the present invention, when resource is allocated, units of resource allocation are set to be in inverse proportional to a size of a transmission time unit. That is, the sRBG is set to be in inverse proportion to the size of a TTI. For example, when a TTI size is 1 (in case of performing resource allocation using 1 TTI), sRBG may be 8 RGBs.

Figure 14:
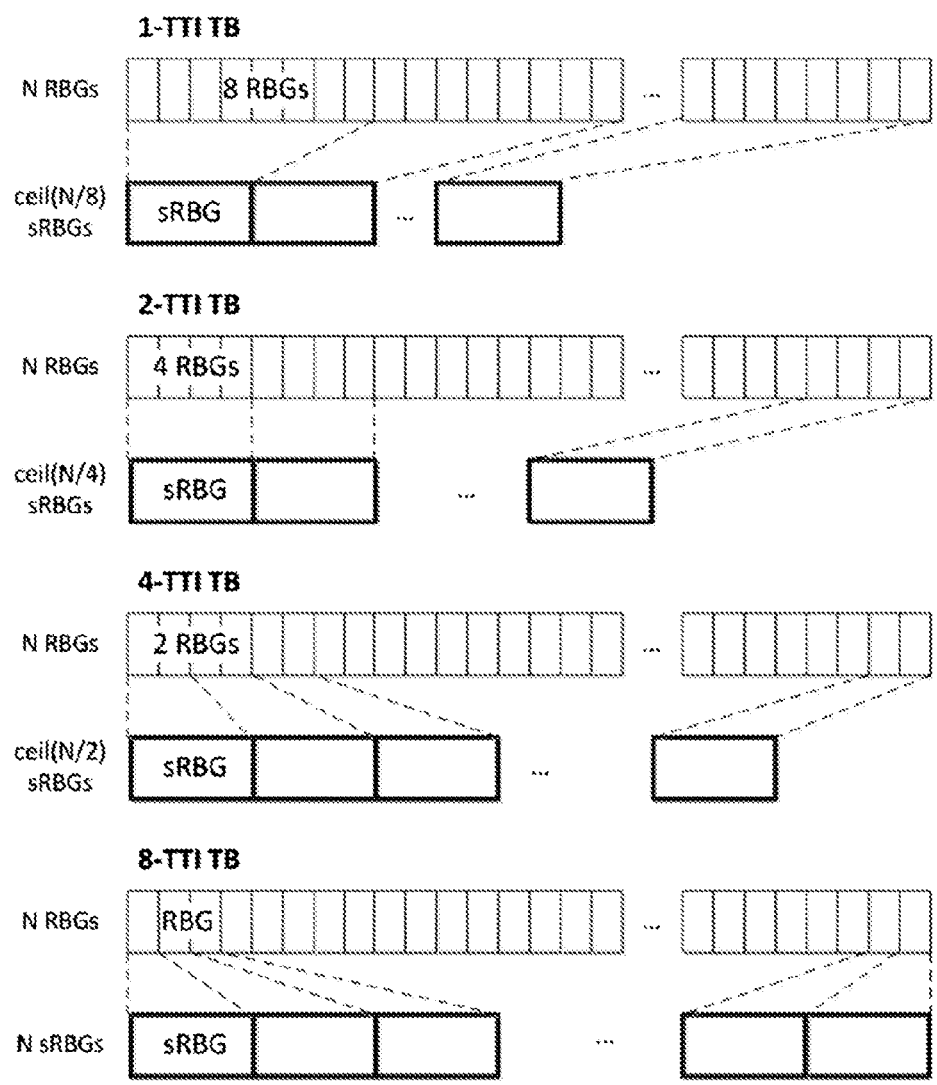
FIG. 14 is a view illustrating sizes of sRBGs for each TTI in allocating resource according to another exemplary embodiment of the present invention.

FIG. 14 is a view illustrating sizes of sRBGs for each TTI in allocating resource according to another exemplary embodiment of the present invention.

In an exemplary embodiment of the present invention, in case of using a TTI having one symbol length, 8 RGBs may be set to one allocation unit (sRBG) as illustrated in FIG. 14. That is, a size of the sRBG is sRBG=8×RBG. In FIG. 14, N sRBG indicates the number of sRBGs. In a case in which the size of TTIs is increased to cause a transmission for a longer period of time, a smaller amount of resource such as four RGBs, or the like, is allocated as sRBGs such that an amount of resource allocation information may not be greatly increased compared with the transmission time. That is, as illustrated in FIG. 14, in a case in which data is transmitted using two TTIs, a size of sRBGs is sRBG=4×RBG, in a case in which data is transmitted using four TTIs, a size of sRBGs is sRBG=2×RBG, and in a case in which data is transmitted using eight TTIs, a size of sRBGs is sRBG=RBG. In this case, the maximum number of bits for expressing resource allocation information in a bitmap form may be equal to the number of bits used in the legacy system.

According to the resource allocation method, when resource is allocated in a bitmap form, sRBGs as a size of resource that may be expressed by 1 bit may be relatively increased, and in a case in which a longer transmission time is applied, sRBGs are relatively reduced. In a case in which a shorter transmission time is applied, an amount of resource allocation information is reduced by performing resource allocation in units of a greater frequency channel. As a result, frequency resource may be effectively allocated by using a smaller amount of information.

As discussed above, in the method of setting sRBGs as a unit of resource allocation such that it is in inverse proportion to a size of TTI, that is, the number of TTIs used for data transmission, the sRBGs allocated as illustrated in FIG. 14 are termed a resource partitioning type 1.

Figure 15:
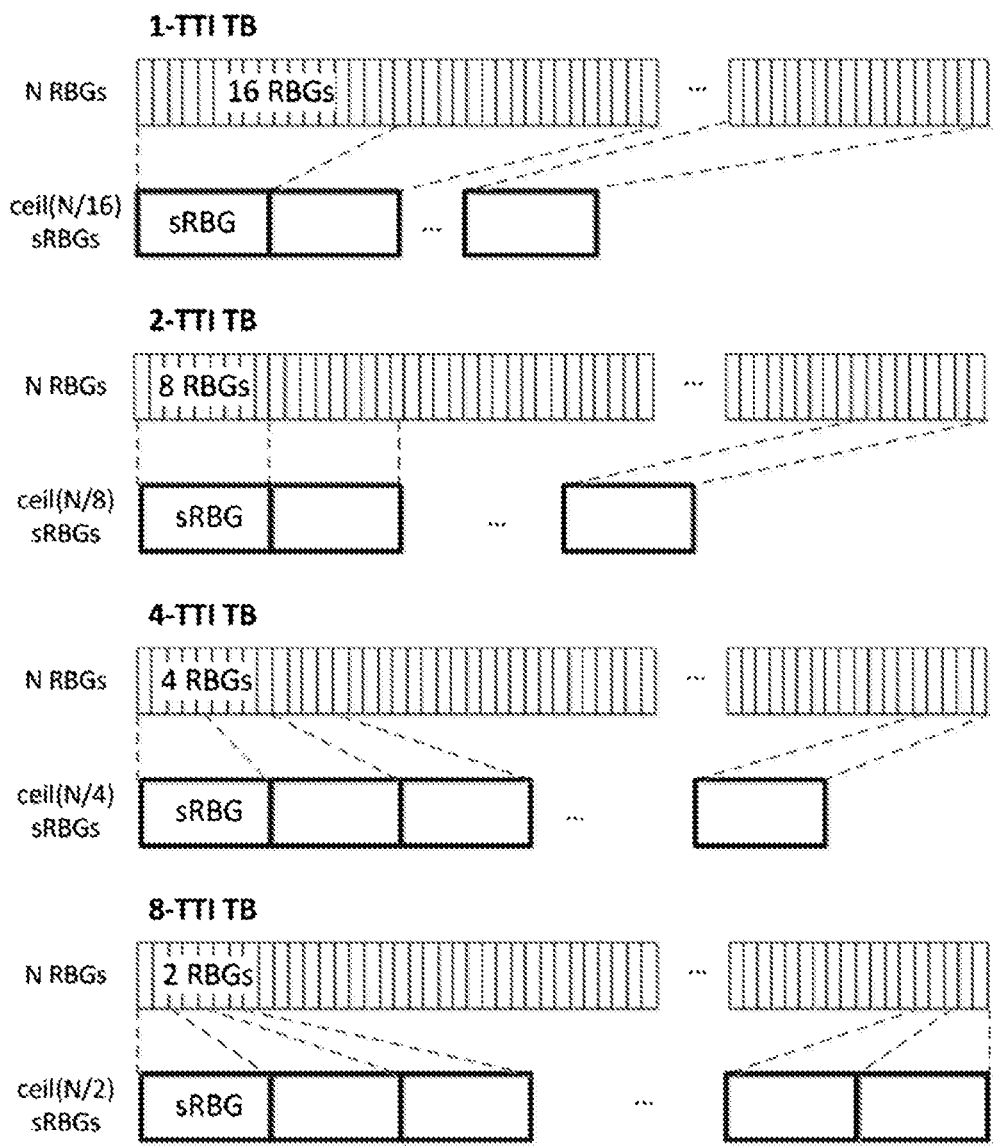
FIG. 15 is a view illustrating sizes of sRBGs for each TTI in a low latency system according to another exemplary embodiment of the present invention.

FIG. 15 is a view illustrating sizes of sRBGs for each TTI in a low latency system according to another exemplary embodiment of the present invention.

sRBGs are set to be in inverse proportion to a size of TTIs, and in case of using a TTI having 1 symbol length, unlike the example of FIG. 14, 16 RGBs may be used as one resource allocation unit as illustrated in FIG. 15. That is, a size of the sRBGs is sRBG=16×RBG. In a case in which data is transmitted using two TTIs, a size of the sRBGs is sRBG=8×RBG, in a case in which data is transmitted using four TTIs, a size of the sRBGs is sRBG=4×RBG, and in a case in which data is transmitted using eight TTIs, a size of the sRBGs is sRBG=2×RBG.

In this case, a maximum number of bits for expressing resource allocation information in a bitmap form is generated in the 8 TTI resource allocation, which has a size reduced by two folds from that of the resource allocation method (or the legacy system) illustrated in FIG. 14. That is, in the case of resource allocation illustrated in FIG. 14, when data is transmitted using eight TTIs, sRBGs as a size of resource that may be expressed by 1 bit is "sRBG=RBG", but in FIG. 15, sRBGs is "sRBG=2×RBG", and thus, the number of bits for expressing resource allocation information is two-fold reduced. The reduced bits may be used as bits for representing the number of cases of the allocated TTIs (for example, four cases of 1, 2, 4, and 8).

In the method of setting sRBGs to be in inverse proportion to the size of TTIs, sRBGs allocated as illustrated in FIG. 15 will be termed a resource partitioning type 1.

In the resource allocation method according to an exemplary embodiment of the present invention, information regarding the resource partitioning type may be provided through downlink control information (DCI). A terminal may check a resource partitioning type in the course of accessing a network. In detail, the terminal may check a resource partitioning type in the process of decoding the DCI for a system information block (SIB) 1 when accessing a network.

Also, information regarding the resource partition type may be transmitted through system information (SIBx, here, x is TBD) for a low latency carrier. In this case, the terminal or a terminal which enters through handover may be operable in a low latency region allocated by the legacy system.

Meanwhile, a method for allocating resource in a block form is a method of designating a start RB and an end RB of resource allocation. When this method is applied to the low latency system, it may cause relatively large overhead in transmitting resource allocation information by short TTIs.

In allocating resource in a block form, resource allocation information indicates a start of resource and a length of resource. The length indicates the number of successively allocated resource blocks. In an exemplary embodiment of the present invention, when resource in a block form is allocated, resource allocation information is processed as follows.

Figure 16:
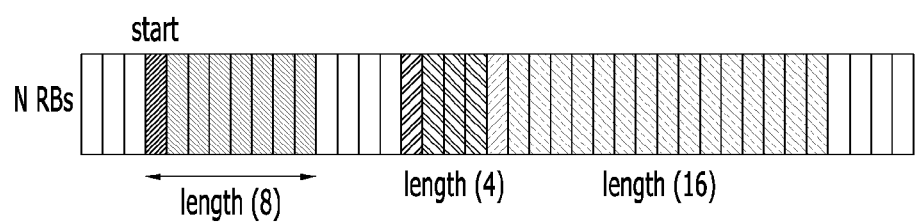
FIG. 16 is a view illustrating resource allocation in a block form according to another exemplary embodiment of the present invention.

FIG. 16 is a view illustrating resource allocation in a block form according to another exemplary embodiment of the present invention.

In allocating resource in a block form, as illustrated in FIG. 16, resource is allocated in units of RB, and resource allocation information indicates a start of allocated information and a length thereof. An amount of RBs corresponding to the length from the start RB are allocated. In an exemplary embodiment of the present invention, a length of resource allocation information is indicated by a value of an exponential function. Since the length of resource allocation information is allocated in the form of an exponential function, lengths may be indicated by using a smaller number of bits, allowing transmission resource having various sizes to be allocated. Such a resource allocation method may also be termed a resource allocation method in an exponential-start-length form.

In a case in which a length is allocated in the form of exponential function, a required amount of information may be expressed by Equation 2 below.

$$IA = \left\lceil \log_2 \sum_{i=1}^{N_{RB}^{DL}} (\lceil \log_2(N_{RB}^{DL} - i + 1) \rceil + 1) \right\rceil \quad \text{[Equation 2]}$$

Here, IA denotes a required amount of information and $N_{RB}^{DL}$ denotes a system bandwidth.

When resource is allocated in a block form, resource allocation may be performed to have a smaller amount of information.

One of methods for implementing the aforementioned resource allocation method is a method for determining a start and a length according to a resource allocation index when resource of $N_{RB}^{DL}$ exists. When a position of a start RB is s and a length is I, resource allocation index may be obtained as expressed by Equation 3 below.

$$\text{Index}(s, l) = \sum_{i=1}^{s-1} (\lceil \log_2(N_{RB}^{DL} - i + 1) \rceil + 1) + \log_2 l \quad \text{[Equation 3]}$$

Another implementation method is a method of designing a resource indication value (RIV) as expressed by Equation 4 below.

$$RIV = (1 + \lceil \log_2 N_{RB}^{DL} \rceil) \cdot s + \log_2 l \quad \text{[Equation 4]}$$

When the resource indication value (RIV) described above is used, the number (IA) of bits required for resource allocation may be expressed by Equation 5 below.

$$IA = \lceil \log_2(N_{RB}^{DL} \cdot (1 + \lceil \log_2 N_{RB}^{DL} \rceil)) \rceil \quad \text{[Equation 5]}$$

Figure 17:
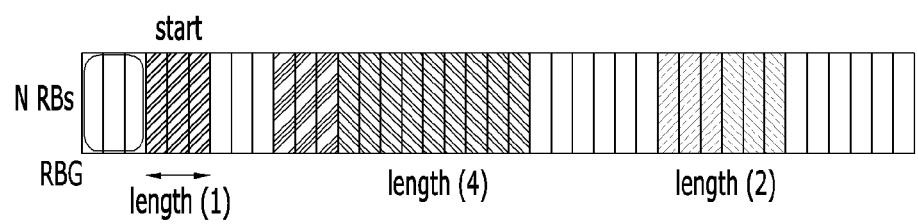
FIG. 17 is a view illustrating resource allocation in a block form according to another exemplary embodiment of the present invention.

FIG. 17 is a view illustrating resource allocation in a block form according to another exemplary embodiment of the present invention.

When resource is allocated in a block form, resource is allocated in units of RGB, rather than RB, as illustrated in FIG. 17. That is, a unit of a start and a length is RGB, rather than RB. Similar to the case of FIG. 16, the entire RBs are grouped in units of RGB, and resource is allocated in units of RGB, whereby the number of RGBs corresponding to the length from the start RGB are allocated. For example, as illustrated in FIG. 17, an RGB includes three RBs, and grouping is performed on the entire RBs to group three RBs to one RGB. While performing resource allocation on the basis of the RGBs, a length of resource allocation information is indicated by a value of exponential function.

In this case, a required amount of information (IA) may be expressed by Equation 6 below.

$$IA = \left\lceil \log_2 \sum_{i=1}^{\lceil N_{RB}^{DL}/P \rceil} (\lceil \log_2(\lceil N_{RB}^{DL}/P \rceil - i + 1) \rceil + 1) \right\rceil \quad \text{[Equation 6]}$$

Here, P denotes the number of RBs constituting an RGB. For example, in a case in which three RBs form an RGB, P is 3.

The method of allocating resource in a block form may be applied according to resource partitioning types. For example, as described above, in a case in which resource partitioning type 1 is used, a BS perform block resource allocation in units of RB such as illustrated in FIG. 16 and indicates a length of resource allocation information by a value of exponential function. Also, in case of using resource partitioning type 2, the BS performs block resource allocation in units of RGB such as illustrated in FIG. 17, and indicates a length of resource allocation information by a value of exponential function.

Also, the method of allocating resource in a block form according to an exemplary embodiment of the present invention may be applied according to the number of TTIs allocated in data transmission. In a case in which data is transmitted by using TTIs equal to or greater than a preset TTI number (for example, four TTIs), for example, four TTIs or eight TTIs, block resource allocation in units of RBs illustrated in FIG. 16 is performed, and a length of resource allocation information is indicated by a value of exponential function. Also, in a case in which data is transmitted by using TTIs equal to or greater than the preset TTI number, for example, one TTI or two TTIs, block resource allocation in units of RGBs illustrated in FIG. 17 is performed, and a length of resource allocation information is indicated by a value of exponential function.

In this manner, by expressing the length of the allocated resource blocks in the form of exponential function, rather than using it linearly, frequency resource may be more minutely allocated by using a smaller number of bits, and resource allocation in a larger unit may be performed.

Figure 18:
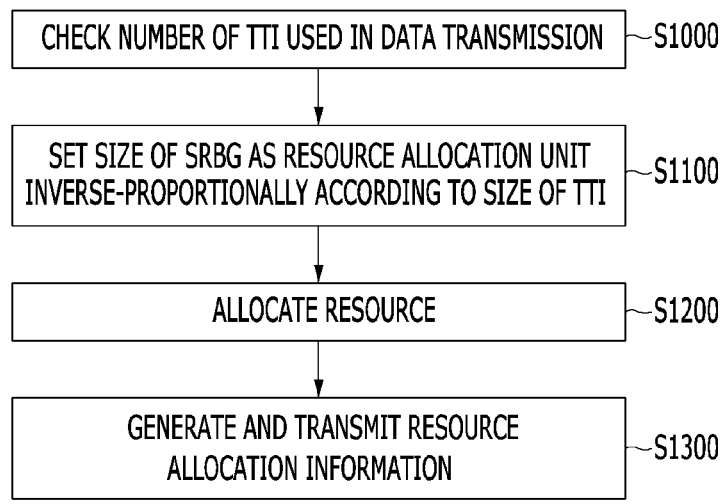
FIG. 18 is a flow chart illustrating a method for transmitting resource allocation information according to another exemplary embodiment of the present invention.

FIG. 18 is a flow chart illustrating a method for transmitting resource allocation information according to another exemplary embodiment of the present invention.

A BS checks the number of TTIs used for data transmission (S1000)

The BS sets a size of sRBGs as a resource allocation unit on the basis of the number of TTIs, that is, a size of TTIs (S1100). In detail, as illustrated in FIG. 14, a size of sRBGs as a resource allocation unit may be set to be in inverse proportion to the size of the TTIs used for data transmission (resource partitioning type 1), or as illustrated in FIG. 15, when a size of sRBGs as a resource allocation unit is set to be in inverse proportion to the size of the TTIs, the size of the sRBGs may be set to be greater twice than the resource partitioning type 1 (resource partitioning type 2).

Thereafter, resource allocation is performed on the basis of the set size of the sRBGs (S1200), and information regarding the allocated resource, that is, resource allocation information, is generated (S1300).

The resource allocation information may be generated in a bitmap form, and in this case, the size of sRBGs as a resource allocation unit that may be expressed by 1 bit may be varied inverse proportionally according to TTI sizes. Thus, in a case in which data is transmitted using a smaller number of TTIs, the size of sRBGs that may be expressed by 1 bit is increased, and thus, an amount of resource allocation information is relatively reduced. The generated resource allocation information may be transmitted through a PDCCH. Meanwhile, information regarding the resource partitioning type according to sizes of the sRBG may be provided through a DCI.

Also, in the case of the resource partitioning type 1, resource allocation information may be indicated in a block form. In this case, the resource allocation information includes a start RB and a length of allocated resource, and the length is expressed by a value in an exponential form. In the case of the resource partitioning type 2, resource allocation information may include a start RGB and a length of allocated resource, and the length may be expressed by a value in an exponential form.

Figure 19:
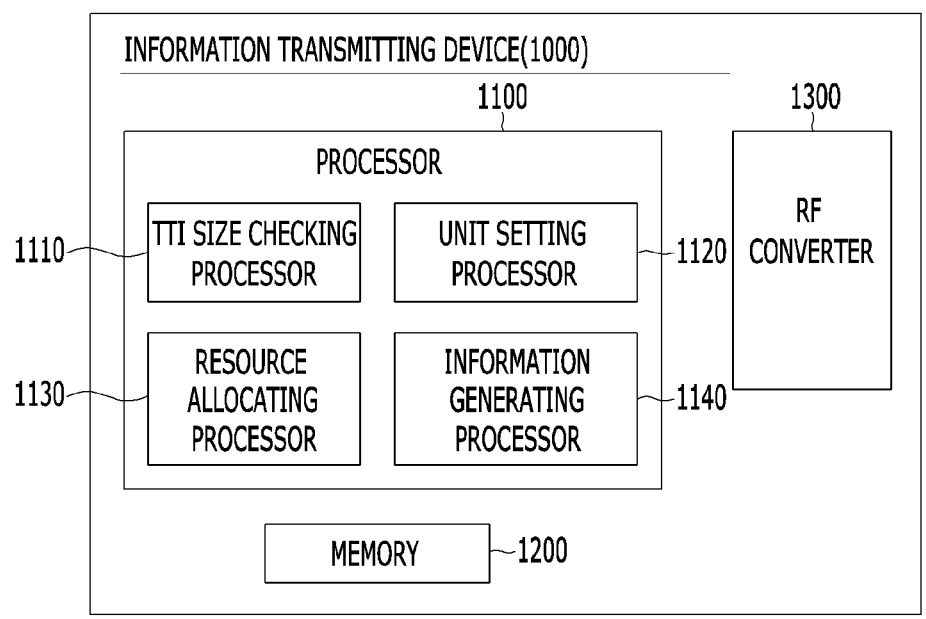
FIG. 19 is a view illustrating a structure of an information transmitting apparatus according to another exemplary embodiment of the present invention.

FIG. 19 is a view illustrating a structure of an information transmitting apparatus according to another exemplary embodiment of the present invention.

As illustrated in FIG. 19, an information transmitting apparatus according to another exemplary embodiment of the present invention includes a processor 1100, a memory 1200, and an RF converter 1300. The processor 1100 may be configured to implement the methods described above with reference to FIGS. 12 through 18.

To this end, the processor 1100 includes a TTI size checking processor 1110, a unit setting processor 1120, a resource allocating processor 1130, and an information generating processor 1140.

The TTI size checking processor 1110 checks a size of TTIs used for data transmission. That is, the TTI size checking processor 1110 checks the number of TTIs used for data transmission, and uses the checked number of TTIs as a size of TTIs.

The unit setting processor 1120 sets a resource allocation unit. In detail, the unit setting processor 1120 sets a size of sRBGs inverse proportionally on the basis of the size of TTIs. Here, the set size of sRBGs may be set as the resource partitioning type 1 processed as a first set value or may be set as the resource partitioning type 2 processed as a second set value, and here, a relationship of the first set value×2=the second set value may be satisfied.

The unit setting processor 1120 may set a resource allocation unit to an RB unit or an RGB unit.

The resource allocating processor 1130 performs resource allocation according to the set resource allocation unit. The resource allocating processor 1130 may perform resource allocation in a bitmap form or in a block form.

The information generating processor 1140 generates information regarding resource allocation, that is, resource allocation information. When resource allocation is performed in the bitmap form, resource allocation information is indicated in the bitmap form. When resource allocation is performed in the block form, resource allocation information includes a resource allocation unit at which allocated source starts and a length, and the length is expressed in the form of an exponential function. The information generating processor 1140 may transmit the resource allocation information.

The memory 1200 is connected to the processor 1100 and stores various types of information related to an operation of the processor 1100. The RF converter 1300 is connected to the processor 1100 and transmits or receives an RF signal.

According to an exemplary embodiment of the present invention, in a mobile communication system providing a low latency service, by differentiating a time interval in which a control region transmitting control information is transmitted according to delay time characteristics required for each terminal, frequency for a terminal to receive wireless transmission for receiving control information and perform a decoding process for determining whether there is control information transmitted to the terminal may be significantly lowered. Thus, power consumption of a terminal accessing a wireless network supporting low latency may be reduced.

Also, in a mobile communication system providing a low latency service, resource allocation may be performed with a smaller amount of information than that of an existing system. In addition, when a data transmission is performed using multiple TTIs to overcome inefficiency due to a shortened TTI, a resource allocation unit is varied. As a result, resource allocation information may be reduced and data may be more effectively transmitted.

The exemplary embodiments of the present invention may not necessarily be implemented only through the foregoing devices and/or methods but may also be implemented through a program for realizing functions corresponding to the configurations of the embodiments of the present invention, a recording medium including the program, or the like. Such an implementation may be easily conducted by a person skilled in the art to which the present invention pertains from the foregoing description of exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting information in a mobile communication system providing a low latency service, the method comprising:
    obtaining, by a base station, delay time requirements of terminals, wherein the delay time requirements represent required delay times of data packets according to characteristics of services provided to each of the terminals;
    determining, by the base station, time intervals for transmitting control information for respective terminals based on the obtained delay time requirements for the respective terminals;
    determining, by the base station, offsets of the respective terminals;
    transmitting, by the base station, control information to the respective terminals through control regions, wherein the control information includes the time intervals and the offsets,
    wherein the control regions for transmitting control information for the respective terminals are configured based on the time intervals and the offsets for the respective terminals;
    before the transmitting of control information, obtaining frame numbers based on the time intervals and the offsets; and
    configuring the control regions by shortframes respectively corresponding to the obtained frame numbers;
    wherein in the obtaining of the frame numbers, frame numbers satisfying a condition of (SN % interval)==offset are obtained, wherein SN denotes a shortframe number.

2. The method of claim 1, wherein the intervals are calculated in units of shortframe by the set values, and a shortframe represents a subframe for forming a transmission time interval (TTI) shorter than an existing TTI, and
    Wherein a transmission delay time required for transmitting transmission data is set to be smaller than or equal to a time duration corresponding to the delay time requirements, and the transmission delay time is varied according to the intervals and a number of TTIs used in the transmission data.

3. The method of claim 1, wherein the determining of the time intervals comprises configuring the intervals and offsets based on delay time requirements previously set according to terminal types.

4. The method of claim 1, wherein the transmitting of the control information further comprises: transmitting a resource allocation message including a start field indicating a position of a resource in which data transmission is performed.

5. The method of claim 1, further comprising:
adding, by the base station, an indicator in control information of a shortframe positioned ahead of a set shortframe such that a certain terminal does not receive control information in the set shortframe formed as a certain one shortframe or continued shortframes; and
transmitting, by the base station, the control information having the added indicator in the shortframe positioned ahead.

6. The method of claim 5, wherein
in the adding of the indicator, when there is no control information to be transmitted to a certain terminal in an n-th shortframe, the indicator is added to control information of an (n−1)-th shortframe, and
in the transmitting, the control information having the added indicator is transmitted in the (n−1)-th shortframe.

7. The method of claim 6, wherein
in the adding of the indicator, when the terminals are classified into groups and there is no control information to be transmitted to the n-th shortframe with respect to all the terminals of a certain terminal group, the indicator is added.

8. The method of claim 1, wherein a terminal performs decoding in a control region corresponding to the determined time intervals and the offsets which are transmitted from the base station and does not perform decoding in control regions except for the control region.

9. An apparatus for transmitting information in a mobile communication system providing a low latency service, the apparatus comprising:
a radio frequency (RF) converter configured to transmit and receive a signal through an antenna; and
a processor connected to the RF converter and configured to transmit control information,
wherein the processor comprises:
a request obtaining processor configured to obtain delay time requirements of terminals, wherein the delay time requirements represent required delay times of data packets according to characteristics of services provided to each of the terminals;
a control region configuring processor configured to determine time intervals for transmitting control information for respective terminals based on the obtained delay time requirements, determine offsets of the respective terminals, and configure control regions for transmitting control information of the respective terminals based on the time intervals and the offsets; and
a control information transmission processor configured to:
transmit control information to the terminals through the control regions, wherein the control information includes the time intervals and the offsets,
before the transmitting of control information, obtain frame numbers based on the time intervals and the offsets, and
configure the control regions by shortframes respectively corresponding to the obtained frame numbers,
wherein in the obtaining of the frame numbers, frame numbers satisfying a condition of (SN % interval)==offset are obtained, wherein SN denotes a shortframe number.

10. The apparatus of claim 9, wherein
the intervals are calculated in units of shortframe by the preset values, the shortframes represent subframes constituting a transmission time interval (TTI) shorter than an existing TTI, and a transmission delay time required for transmitting transmission data is varied according to the intervals and a number of TTIs of the transmission data.

11. The apparatus of claim 9, wherein
the control information transmission processor transmits a resource allocation message including a start field indicating a position of a resource in which data transmission is performed.

12. The apparatus of claim 9, further comprising:
a non-reception notification processor configured to, when there is no control information to be transmitted to a certain terminal in an n-th shortframe, add an indicator indicating corresponding information to control information of an (n−1)-th shortframe and transmit the indicator-added control information.

13. The apparatus of claim 12, wherein
when the terminals are classified into groups and there is no control information to be transmitted in the n-th shortframe with respect to all the terminals of a certain terminal group, the non-reception notification processor adds the indicator to the control information and transmits the indicator-added control information.

* * * * *